Figure 1:
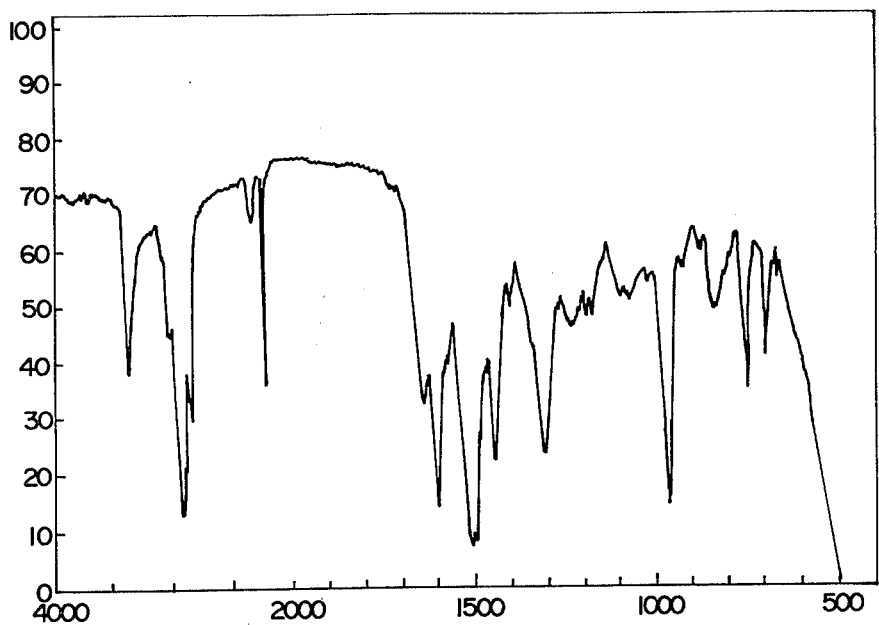

United States Patent [19]

Kotani et al.

[11] 4,334,044

[45] Jun. 8, 1982

[54] DIENE RUBBER HAVING ANTI-DETERIORATING FUNCTION AND PROCESS FOR PRODUCTION THEREOF

[75] Inventors: Teizo Kotani, Yokohama; Yasuhiko Takemura; Toshio Miyabayashi, both of Yokkaichi, all of Japan

[73] Assignee: Japan Synthetic Rubber Co., Ltd., Tokyo, Japan

[21] Appl. No.: 147,529

[22] Filed: May 7, 1980

[30] Foreign Application Priority Data

May 18, 1979 [JP] Japan ................................. 54/60526

[51] Int. Cl.$^3$ ................................................ C08F 8/32
[52] U.S. Cl. ..................................... 525/379; 525/132; 525/151; 525/152; 525/194; 525/380; 525/381
[58] Field of Search ............... 525/382, 379, 380, 132, 525/151, 152, 194; 260/45.9 AA, 45.9 AD, 45.9 R, 45.9 QA, 45.9 QB

[56] References Cited

U.S. PATENT DOCUMENTS

| | | | |
|---|---|---|---|
| 2,395,505 | 6/1945 | Sarbach | 525/382 |
| 3,009,899 | 11/1961 | Stahly | 260/45.9 AD |
| 3,032,520 | 5/1962 | Shaw | 260/45.9 AD |
| 3,098,841 | 7/1963 | Morris et al. | 260/45.9 AD |
| 3,157,615 | 11/1964 | Stahly | 260/45.9 AD |
| 3,161,612 | 12/1964 | Ley et al. | 260/45.9 AD |
| 3,311,572 | 3/1967 | Stovey et al. | 525/382 |
| 3,335,110 | 8/1967 | Mino et al. | 260/45.9 AD |
| 3,630,989 | 12/1971 | Aunt et al. | 260/45.9 AD |
| 3,676,394 | 7/1972 | Murray et al. | 260/45.9 AD |
| 3,676,396 | 7/1972 | Wakefield | 260/45.9 AD |
| 3,817,916 | 6/1974 | Parks | 260/45.85 |
| 3,979,358 | 9/1976 | Nishibata et al. | 260/45.75 N |
| 4,138,389 | 2/1979 | Edwards | 260/45.7 R |

FOREIGN PATENT DOCUMENTS

1221595 2/1971 United Kingdom .

*Primary Examiner*—William F. Hamrock
*Attorney, Agent, or Firm*—Oblon, Fisher, Spivak, McClelland & Maier

[57] ABSTRACT

By reacting a diene polymer having nitrile groups with an anti-deteriorating agent having at least one polar group selected from the group consisting of amino group and imino group in the presence of a catalyst, a diene rubber can be obtained in which said anti-deteriorating agent is chemically combined to the nitrile groups. Said rubber per se has resistance to deterioration and, at the same time, acts as an anti-deteriorating agent for other diene rubbers. The chemically combined anti-deteriorating agent is not extractable with solvent, so that said rubber has a stable resistance to deterioration and a stable anti-deteriorating action on other diene rubbers.

22 Claims, 2 Drawing Figures

DIENE RUBBER HAVING ANTI-DETERIORATING FUNCTION AND PROCESS FOR PRODUCTION THEREOF

This invention relates to a process for producing a rubber excellent in resistance to deterioration. More particularly, it relates to a diene rubber chemically combined with an anti-deteriorating agent, which has per se stabilized resistance to oil, heat and weather and can exhibit an anti-deteriorating function when mixed with other rubbers, as well as to a process for the production thereof.

Among the prior art references disclosing anti-deteriorating agents, U.S. Pat. No. 3,817,916, Japanese Patent Publication No. 982/76, U.S. Pat. No. 3,979,358, etc. describe the use of acrylate or methacrylate derivatives, the acryl or methacryl group of which is chemically combined with an anti-deteriorating agent having an amino and/or imino group, as a reactive or non-extractable anti-deteriorating agent. Though said acrylate or methacrylate derivative is effective as a simple anti-deteriorating agent, it has been revealed by the studies of the present inventors (Kotani et al.: Nippon Gomu Kyokai-shi, 43, pp. 198 (1970); and many other papers) that said acrylate or methacrylate derivative is difficult to introduce into a polymer as its one constituent by means of radical polymerization. Further, when said acrylate or methacrylate derivative is mixed with a diene polymer and the two are chemically combined while molding and crosslinking their mixture, the efficiency of said acrylate or methacrylate derivative being chemically combined with the diene polymer is low. For example, if the molded and cross-linked product of the mixture is extracted with boiling acetone for 24 hours in Soxhlet's extractor, 50% or more of the acrylate or methacrylate derivative is extracted.

Considering that there is a limit in the reaction between the double bond of a diene polymer and the double bond of an anti-deteriorating agent or its derivative, the present inventors have extensively studied other methods for chemically combining both substances with the aim of obtaining an anti-deteriorating agent non-extractable with a solvent. As a result, an excellent method of chemically combining the two with each other has been discovered. That is to say, the present inventors have found that when a diene polymer having nitrile groups is directly reacted with an anti-deteriorating agent having an amino and/or imino group, the conversion of the anti-deteriorating agent can exceed 90%. It has also been found that a catalyst is necessary for conducting the reaction because this reaction takes place between the amino and/or imino group of the anti-deteriorating agent and the nitrile groups of the diene polymer as will be mentioned hereinafter. Further, a specific catalyst effective for obtaining high conversion has been discovered.

According to this invention, there is provided a diene rubber having resistance to deterioration and an anti-deteriorating function which has been obtained by reacting a diene polymer having nitrile groups with an anti-deteriorating agent having at least one polar group selected from the group consisting of amino and imino groups in the presence of a catalyst.

This invention further provides a process for producing a diene rubber having resistance to deterioration and an anti-deteriorating function which comprises reacting a diene polymer having nitrile groups with an anti-deteriorating agent having at least one polar group selected from the group consisting of amino and imino groups in the presence of a catalyst.

The diene polymers usable in this invention include copolymers of a diene compound, such as butadiene, isoprene, chloroprene, piperylene, pentadiene, hexadiene, heptadiene, octadiene, 2,3-dimethylbutadiene and the like, and a vinyl cyanide compound, such as acrylonitrile, methacrylonitrile and the like, and copolymers of said diene compound, said vinyl cyanide compound and at least one other compound having a vinyl group. Examples of said other compounds having a vinyl group include acrylic acid, methacrylic acid, alkyl acrylate, alkyl methacrylate, styrene, α-methylstyrene and the like. Said diene polymer having a nitrile group may have a number average molecular weight of at least 1,000. The content of the vinyl cyanide compound in said diene polymer having a nitrile group is preferably in the range from 5 to 60% by weight. If the content of the vinyl cyanide compound is less than 5% by weight, the rubber obtained is poor in anti-deteriorating effect. If it exceeds 60% by weight, the product is apt to be too hard to be used alone and difficult to disperse when mixed with other diene rubbers.

The anti-deteriorating agents having at least one polar group selected from the group consisting of amino and imino groups, usable in this invention include aliphatic amines such as methylamine, dimethylamine, diethylamine, isopropylamine, n-propylamine and the like and amino compounds having an aromatic ring, among which the latter compounds are preferable. Particularly preferable as the anti-deteriorating agent are p-aminophenol, diphenylamine, alkylated diphenylamine, p-alkoxydiphenylamine, p-hydroxydiphenylamine, N,N'-diphenyl-p-phenylenediamine, N,N'-ditolyl-p-phenylenediamine, N,N'-dinaphthyl-p-phenylenediamine, N-phenyl-N'-isopropyl-p-phenylenediamine, 2,2,4-trimethyldihydroquinoline polymer, N-phenyl-p-phenylenediamine, N,N'-dialkyl-p-phenylenediamine, N-phenyl-N'-cyclohexyl-p-phenylenediamine and the like. These compounds may be used alone or in admixture of two or more.

When, in this invention, a diene polymer having a nitrile group is reacted with an anti-deteriorating agent having at least one polar group selected from the group consisting of amino and imino groups, the molar proportion of the anti-deteriorating agent used is not particularly limited. However, it is preferably in the range of from 0.1 to 100 mole percent based on the total moles of nitrile groups in the diene polymer. If this molar proportion is less than 0.1 mole percent, the anti-deteriorating effect is relatively small. If it exceeds 100 mole percent, the quantity of unreacted anti-deteriorating agent extractable with solvent increases.

Examples of the catalyst usable in this invention for reacting a diene polymer having nitrile groups with the anti-deteriorating agent include Lewis acids such as aluminum chloride, ferric chloride, stannic chloride, boron trifluoride, zinc chloride and the like; and protonic acids such as hydrochloric acid, sulfuric acid and the like. Among them, Lewis acids are more preferable in view of activation and gelation, and boron trifluoride is most preferable. Since boron trifluoride is normally gaseous and hence difficult to use as it is, the same is usually used in the form of an etherate, but even in this case, boron trifluoride per se acts as the catalyst. The amount of said catalyst is preferably in the range of from 1 to 50 mole percent based on the mole of amine or imine, namely, the anti-deteriorating agent.

In this reaction, inert solvents in which the diene polymer containing nitrile groups and the anti-deteriorating agent can be dissolved but which are unreactive with them may be used. Examples of said solvents include aromatic hydrocarbons, aliphatic hydrocarbons and halogenated hydrocarbons, among which aromatic hydrocarbon solvents are preferable.

The reaction can be carried out at a temperature of 100° C. to 250° C. After completion of the reaction, the catalyst is removed from the polymer solution if necessary, and then the solution is poured into a liquid, in which the reaction product is not dissolved, to precipitate the latter. By repeating the dissolution and reprecipitation, a purified polymer having an anti-deteriorating function can be obtained.

The diene polymer chemically combined with an anti-deteriorating agent obtained according to this invention, has per se resistance to deterioration, so that it can be used in the same manner as the prior anti-deteriorating agent-containing diene rubbers. In addition, it has a function of preventing other rubbers from deterioration, so that a deterioration-resistant rubber composition can be obtained by blending the rubber of this invention, depending upon purpose, with polybutadiene rubber, natural rubber, polyisoprene rubber, styrene-butadiene rubber, acrylonitrile-butadiene rubber, acrylonitrile-acrylate-butadiene terpolymer rubber, acrylonitrileisoprene-butadiene terpolymer rubber, polychloroprene rubber or the like or a mixture thereof, and then molding and crosslinking the resulting mixture. In this case, the diene polymer chemically combined with an anti-deteriorating agent is readily fixed on the above-mentioned other diene polymers, so that when the crosslinked product of the rubber mixture is extracted with a solvent such as benzene, toluene, chloroform, gasoline or the like, the polymer having an anti-deteriorating function is left unextracted.

Industrially, there are very many cases that a crosslinked rubber comes into contact with a solvent, as in hose, packing and others. In such cases, usual anti-deteriorating agents are extracted so that their anti-deteriorating effect decreases. In contrast thereto, in the polymer having an anti-deteriorating function chemically combined with an anti-deteriorating agent obtained by the process of this invention, neither the anti-deteriorating agent combined with the rubber nor the anti-deteriorating agent-combined rubber per se is extracted, so that it is possible to easily prepare a vulcanized rubber excellent in resistances to oil, heat and weather in industry.

Figure 2:
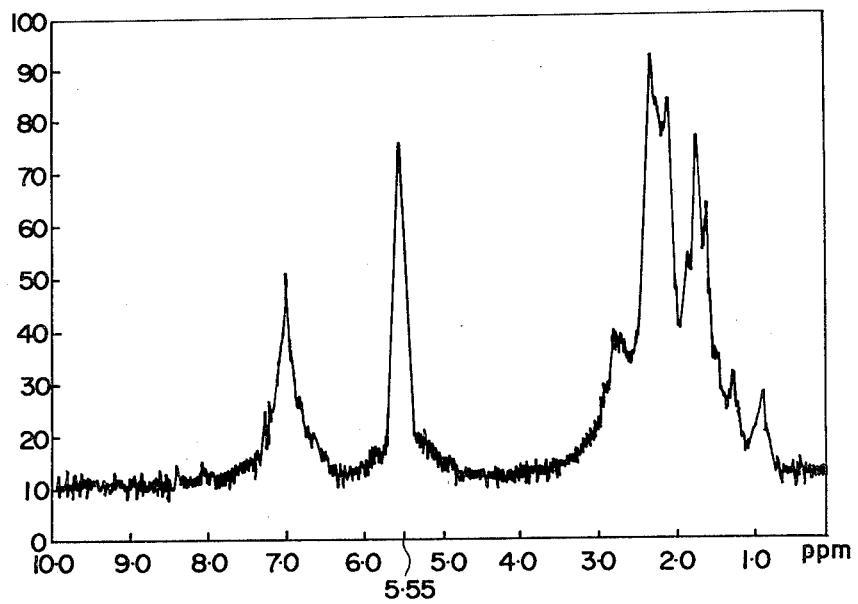

Referring to Examples and the accompanying drawings, this invention will be explained more specifically. In the accompanying drawings, FIG. 1 illustrates the infrared absorption spectrum of the reaction product obtained in Example 2, and FIG. 2 illustrates the nuclear magnetic resonance spectrum thereof.

The Examples are by way of illustration and not by way of limitation.

EXAMPLES 1 AND 2 AND COMPARATIVE EXAMPLES 1 TO 3

A 5% by weight xylene solution of 108 g of acrylonitrile-butadiene rubber (NBR) (JSR N 230 S: manufactured by Japan Synthetic Rubber Co., Ltd.) having a combined nitrile content of 35% by weight and a Mooney viscosity ($ML_{1+4}$(100° C.)) of 56 was prepared and divided into 5 portions. To each portion of the solution was added 0 g, 1.21 g, 12.1 g, 1.21 g and 12.1 g of N-phenyl-p-phenylenediamine (molecular weight 184) (Comparative Examples 1, 2 and 3 and Examples 1 and 2, respectively). Further, to the solutions of Examples 1 and 2 were added 0.28 g and 2.8 g of boron trifluoride etherate (each 30 mole percent based on the mole of N-phenyl-p-phenylenediamine), respectively, under a nitrogen atmosphere. The solutions were subjected to reaction for 12 hours under reflux, neutralized with an equimolar quantity, based on the catalyst, of sodium carbonate, and washed with water, after which NBR was precipitated from methanol and then twice purified by reprecipitation from benzene/methanol system. Yields are shown in Table 1. FIG. 1 shows the infrared absorption spectrum of the purified product of the reaction product obtained by adding 12.1 g of N-phenyl-p-phenylenediamine and 2.8 g of boron trifluoride etherate (Example 2). Further, the same purified product was dissolved in a mixture of acetone and a small quantity of heavy water and its nuclear magnetic resonance spectrum was measured to obtain the result shown in FIG. 2. From these results, it is understood that a reaction product between NBR and the anti-deteriorating agent is obtained.

On the other hand, the infrared absorption spectra of the products of Comparative Examples 2 and 3 were similarly measured. It was found that no reaction product between NBR and anti-deteriorating agent was obtained.

Based on the absorptions due to phenyl group (6.3–7.9 ppm) and vinylic hydrogen of polymer main chain (4.5–6.2 ppm) appearing in the nuclear magnetic resonance spectra, their contents were calculated and listed in Table 1. Ten grams of each product, purified by reprecipitation, was dissolved in 100 ml of toluene and the time required for absorbing 10 ml/g-rubber of oxygen was measured by means of oxygen absorption meter at 40° C. The results are shown in Table 1.

TABLE 1

| Amount of anti-deteriorating agent reacted and anti-deteriorating effect | | | | | |
|---|---|---|---|---|---|
| | Comparative Example | | | Example | |
| | 1 | 2 | 3 | 1 | 2 |
| Amount of anti-deteriorating agent added (g) | 0 | 1.21 | 12.1 | 1.21 | 12.1 |
| Amount of catalyst added (g) | 0 | 0 | 0 | 0.28 | 2.8 |
| Yield (g) | 21.2 | 21.2 | 21.3 | 22.4 | 32.5 |
| Yield* (%) | 98.1 | 92.9 | 63.2 | 98.2 | 96.3 |
| Conversion** of anti-deteriorating agent (%) | 0 | 0 | 0.1 | 99 | 93 |
| Content of anti-deteriorating agent (%) | 0 | 0 | 0 | 5.4 | 34.6 |
| Time required for absorbing 10 ml oxygen/g (min) | 22 | 23 | 28 | 105 | 197 |

Note:
*The yield was determined based on the following equation:
$$\text{Yield (\%)} = \frac{\text{Weight of the purified polymer obtained}}{\text{Weight of polymer charged} + \text{Weight of anti-deteriorating agent added}} \times 100$$

**The conversion was determined based on the following equation:
$$\text{Conversion (\%)} = \frac{\text{Yield (g)} - \text{Yield (g) in Comparative Example 1}}{\text{Weight of anti-deteriorating agent added}} \times 100$$

It is understood from Table 1 that the reaction products obtained in Examples 1 and 2 prevent NBR from oxidative deterioration even after purification with a solvent.

EXAMPLES 3 TO 8 AND COMPARATIVE EXAMPLE 4

A modified NBR(1) having an anti-deteriorating agent content of about 29% by weight and a modified NBR(2) having an anti-deteriorating agent content of 2.7% by weight were obtained in the same manner as in Examples 1 and 2. Vulcanized sheets were prepared by the usual method using the modified NBR(1) or (2) and commercially available NBR (JSR N 230 S) according to the formulations shown in Table 2. Properties of the vulcanized rubber obtained were measured in accordance with the physical testing method for vulcanized rubber mentioned in JIS K 6301 (1975), and the results are shown in Table 2. Further, the vulcanized products were immersed in a solvent mixture of toluene and isooctane (50/50 by volume) at 40° C. for 48 hours, dried and then thermally deteriorated in a Geer type aging tester at 130° C. for 70 hours and 200 hours. Properties of the tested samples were measured to determine the variation percentages of tensile strength ($T_B$) and elongation ($E_B$) and the variation of hardness ($H_S$). The results are shown in Table 2. It is understood from Table 2 that when a reaction product between anti-deteriorating agent and NBR is used alone or in admixture with commercially available NBR, the rubber is greatly improved in resistance to thermal deterioration even after extraction with a solvent.

iod of about 15 hours until the polymerization conversion reached about 70%. Based on 100 parts by weight of the monomer, 0.5 part by weight of sodium dimethyldithiocarbamate was added to the reaction system as a polymerization terminator, and then steam was introduced to remove the unreacted monomer. The latex thus obtained was poured into a large quantity of methanol, the NBR was dried under reduced pressure and its combined acrylonitrile content was analyzed by Micro Dumas method. The results are shown in Table 4.

TABLE 3

| Formulation for polymerization (parts by weight) | |
|---|---|
| Butadiene | 95–50 |
| Acrylonitrile | 5–50 |
| Water | 250 |
| Sodium alkylbenzenesulfonate | 3.0 |
| Sodium salt of condensed naphthalene-sulfonate | 0.6 |
| Tertiary dodecylmercaptan | 0.55 |
| Potassium persulfate | 0.27 |
| Cyanoethylated diethanolamine | 0.15 |
| Potassium hydroxide | 0.10 |
| Polymerization temperature: 10° C. | |
| Polymerization conversion: up to 70% | |

108 g of each of the NBR samples thus obtained was formed into a 5% solution in xylene. to each NBR sample was added 4.52 g of N-isopropyl-N'-phenyl-p-

TABLE 2

| | Formulations (parts by weight) and properties of vulcanizates | | | | | | |
|---|---|---|---|---|---|---|---|
| | Comparative Example 4 | Example 3 | Example 4 | Example 5 | Example 6 | Example 7 | Example 8 |
| Modified NBR (1) | 0 | 1 | 3 | 10 | 30 | 50 | 0 |
| Modified NBR (2) | 0 | 0 | 0 | 0 | 0 | 0 | 100 |
| JSR N 230 S | 100 | 99 | 97 | 90 | 70 | 50 | 0 |
| Stearic acid | 1 | 1 | 1 | 1 | 1 | 1 | 1 |
| FEF Black | 45 | 45 | 45 | 45 | 45 | 45 | 45 |
| Zinc oxide | 5 | 5 | 5 | 5 | 5 | 5 | 5 |
| Anti-deteriorating agent 224[1] | 2 | 0 | 0 | 0 | 0 | 0 | 0 |
| Sulfur | 0.3 | 0.3 | 0.3 | 0.3 | 0.3 | 0.3 | 0.3 |
| Vulcanization accelerator TT[2] | 2 | 2 | 2 | 2 | 2 | 2 | 2 |
| Vulcanization accelerator MSA[3] | 2 | 2 | 2 | 2 | 2 | 2 | 2 |
| Properties in normal state[4] | | | | | | | |
| $M_{300}$ (kgf/cm$^2$) | 150 | 150 | 150 | 145 | 138 | 107 | 154 |
| $T_B$ (kgf/cm$^2$) | 256 | 255 | 253 | 247 | 235 | 204 | 257 |
| $E_B$ (%) | 560 | 560 | 560 | 560 | 530 | 450 | 560 |
| $H_S$ (JIS-A) | 74 | 75 | 75 | 74 | 72 | 68 | 74 |
| Properties after composite deterioration[5] (130° C. × 70 hrs) | | | | | | | |
| Variation percentage in $T_B$ (%) | −12 | −10 | −7 | −5 | −3 | −2 | −5 |
| Variation percentage in $E_B$ (%) | −55 | −45 | −30 | −25 | −22 | −20 | −24 |
| Variation in $H_S$ | +9 | +8 | +8 | +7 | +7 | +7 | +7 |
| Properties after composite deterioration[5] (130° C. × 200 hrs) | | | | | | | |
| Variation percentage in $T_B$ (%) | −76 | −53 | −40 | −24 | −15 | −12 | −25 |
| Variation percentage in $E_B$ (%) | −90 | −70 | −59 | −47 | −43 | −40 | −49 |
| Variation in $H_S$ | +22 | +17 | +14 | +13 | +12 | +12 | +13 |

Note:
[1]2,2,4-Trimethyl-1,2-dihydroquinoline polymer
[2]Tetramethylthiuram disulfide
[3]N-oxydiethylene-2-benzothiazyl sulfenamide
[4]Vulcanization under press at 160° C. for 15 minutes
[5]The sample was immersed in toluene/isooctane mixture (50/50 by vol.) at 40° C. for 48 hours, dried and then thermally deteriorated in a Geer type aging tester at 130° C. for 70 hours or 200 hours.

EXAMPLES 9–11 AND COMPARATIVE EXAMPLE 5

In order to obtain NBR's having various combined nitrile contents, the polymerization was conducted according to the formulation shown in Table 3 for a period phenylenediamine (molecular weight 226), and the mixture was subjected to reaction in the same manner as in Examples 1 and 2. It is understood from the results of infrared absorption spectrometric analysis and nuclear magnetic resonance spectrometric analysis that reaction products of NBR and anti-deteriorating agent was obtained.

Test pieces were prepared by directly formulating and vulcanizing the reaction products containing the unreacted N-isopropyl-N'-phenyl-p-phenylenediamine, as shown in Table 4.

The properties of the vulcanized products in the normal state were measured in accordance with JIS K 6301. On the other hand, the samples were immersed into ASTM oil No 3 at 40° C. for 100 hours, sufficiently dried, and then thermally deteriorated in a Geer type aging tester at 130° C. for 70 hours. Properties of the deteriorated samples were measured in accordance with JIS K 6301. The results are summarized in Table 4.

TABLE 4

Analyses of NBR obtained from the formulation of Table 3, compounding formulation with SBR and properties of vulcanizate.

|  | Example | | | Comparative |
| --- | --- | --- | --- | --- |
|  | 9 | 10 | 11 | Example 5 |
| Content of combined acrylonitrile (%) | 6 | 29 | 47 | 29 |
| Reaction product between the NBR of the formulation of Table 3 and anti-deteriorating agent | 50 | 50 | 50 | 50[4] |
| JSR 1502[1] | 50 | 50 | 50 | 50 |
| HMF Black | 60 | 60 | 60 | 60 |
| DBP | 20 | 20 | 20 | 20 |
| Zinc oxide | 5 | 5 | 5 | 5 |
| Stearic acid | 1 | 1 | 1 | 1 |
| Vulcanization accelerator DM[2] | 1.5 | 1.5 | 1.5 | 1.5 |
| Sulfur | 2 | 2 | 2 | 2 |
| Properties of vulcanizate in normal state (vulcanization at 153° C. for 30 min.) | | | | |
| $T_B$ (kgf/cm$^2$) | 187 | 176 | 128 | 185 |
| $E_B$ (%) | 420 | 330 | 260 | 350 |
| $H_S$ (JIS-A) | 55 | 60 | 62 | 59 |
| After composite deterioration[3] (130° C. × 70 hours) | | | | |
| Variation percentage in $T_B$ (%) | −13 | −9 | −14 | −17 |
| Variation percentage in $E_B$ (%) | −46 | −40 | −48 | −68 |
| Variation in $H_S$ | +12 | +10 | +15 | +18 |

Note:
[1]Styrene-butadiene rubber having a combined styrene content of 23.5% by weight and a Mooney viscosity (ML$_{1+4}$ (100° C.)) of 52.
[2]Dibenzothiazyl disulfide
[3]The sample was immersed in ASTM oil No. 3 at 40° C. for 100 hours, dried and then thermally deteriorated in Geer type aging tester at 130° C. for 70 hours.
[4]A simple mixture of NBR and N-isopropyl-N-phenyl-p-phenylenediamine.

EXAMPLES 12-16

A 5% by weight solution in xylene of 108 g of NBR (JSR N 230 S) having a combined acrylonitrile content of 35% by weight was prepared. The solution was mixed with 12.9 g of N-phenyl-p-phenylenediamine and then divided into 5portions. To each portion was added, as a catalyst, boron trifluoride etherate, aluminum chloride, zinc chloride, ferric chloride or stannic chloride in an amount of 30 mole percent based on the amine. The mixture was reacted under reflux for 24 hours, and then the rubber was precipitated with methanol. The effects of the catalysts used are shown in Table 5, wherein the conversion of anti-deteriorating agent (%) was determined as in Examples 1 and 2.

TABLE 5

| | Effects of catalysts | | | | |
| --- | --- | --- | --- | --- | --- |
| Example No. | 12 | 13 | 14 | 15 | 16 |
| Compound (catalyst) | Boron trifluoride etherate | Aluminum chloride | Zinc chloride | Ferric chloride | Stannic chloride |
| Conversion of anti-deteriorating agent (%) | 97 | 87 | 35 | 53 | 18 |

What is claimed is:

1. A diene rubber having resistance to deterioration and an anti-deteriorating function obtained by reacting a polymer, of a conjugated diene monomer having nitrile groups with an anti-deteriorating agent having at least one polar group selected from the group consisting of amino group and imino group in the presence of an acid catalyst.

2. A diene rubber according to claim 1 wherein said polymer having nitrile groups is a copolymer of a conjugated diene compound and a vinyl cyanide compound, or a copolymer of a conjugated diene compound, a vinyl cyanide compound and at least one other compound having a vinyl group.

3. A diene rubber according to claim 2, whrein said conjugated diene compound is butadiene, isoprene, chloroprene, piperylene, pentadiene, hexadiene, heptadiene, octadiene or 2,3-dimethylbutadiene.

4. A diene rubber according to claim 2 or 3, wherein said vinyl cyanide compound is acrylontrile or methacrylonitrile.

5. A diene rubber according to claim 2, wherein said other compound having a vinyl group is acrylic acid, methacrylic acid, an alkyl acrylate, an alkyl methacrylate, styrene or α-methylstyrene.

6. A diene rubber according to claim 2, wherein the content of the vinyl cyanide compound in said polymer having nitrile groups is 5–60by weight.

7. A diene rubber according to claim 1, wherein said anti-deteriorating agent is an aliphatic amine or an amino compound having an aromatic ring.

8. A diene rubber according to claim 1, wherein said anti-deteriorating agent is p-aminophenol, diphenylamine, an alkylated diphenylamine, a p-alkoxydiphenylamine, p-hydroxydiphenylamine, N,N'-diphenyl-p-phenylenediamine, N,N'-ditolyl-p-phenylenediamine, N,N'-dinaphthyl-p-phenylenediamine, N-phenyl-N'-isopropyl-p-phenylenediamine, 2,2,4-trimethyldihydroquinoline polymer, N-phenyl-p-phenylenediamine, N,N'-dialkyl-p-phenylenediamine or N-phenyl-N'-cyclohexyl-p-phenylenedimaine.

9. A diene rubber according to claim 1, wherein the amount of said anti-deteriorating agent is 0.1-100 mole percent based on the total moles of the nitrile groups in said polymer of the conjugated diene.

10. A diene rubber according to claim 1, wherein said catalyst is a Lewis acid or a protonic acid.

11. A diene rubber according to claim 1, wherein said catalyst is aluminum chloride, ferric chloride, stannic chloride, boron triflurode, zinc chloride, hydrochloric acid or sulfuric acid.

12. A diene rubber according to claim 1, wherein said catalyst is boron trifluoride.

13. A process for producing a diene rubber having resistance to deterioration and an anti-deteriorating function which comprises reacting a polymer, of a conjugated diene monomer, having nitrile groups with an anti-deteriorating agent having at least one polar group selected from the group consisting of amino groups and imino group in the presence of an acid catalyst.

14. A process according to claim 13, wherein the reaction is caried out at a temperature of 100°–250° C.

15. A process according to claim 13 or 14, wherein said catalyst is a Lewis acid or a protonic acid.

16. A process according to claim 13, or 14, wherein said catalyst is aluminum chloride, ferric chloride, stannic chloride, boron trifluoride, zinc chloride, hydrochloric acid or sulfuric acid.

17. A process according to claim 13 or 14, wherein said catalyst is boron trifluoride.

18. A process according to claim 13, wherein the reaction is carried out in at least one solvent selected from the group consisting of aromatic hydrocarbons, aliphatic hydrocarbons and halogenated hydrocarbons.

19. A process according to claim 18, wherein said solvent is selected from aromatic hydrocarbons.

20. A process according to claim 13 or 14, wherein said anti-deteriorating agent is at least one member selected from the group consisting of p-aminophenol, diphenylamine, alkylaed diphenylamines, p-alkoxydiphenylamines, N,N'-diphenyl-p-phenylenediamine, N,N'-ditolyl-p-phenylenediamine, N,N'-dinaphthyl-p-phenylenediamine, N-phenl-N'-isopropyl-p-phenylenediamine, 2,2,4-trimethyldihydroquinoline polymer, N-phenyl-p-phenylenediamine, N,N'-dialkyl-p-phenylenediamine and N-phenyl-N'-cyclohexyl-p-phenylenediamine.

21. A deterioration-resistant rubber composition comprising the diene rubber having anti-deteriorating function of claim 1 and at least one other diene rubber.

22. A composition according to claim 21, wherein said other diene rubber is selected from the group consisting of polybutadiene rubber, natural rubber, polyisoprene rubber, styrene-butadiene rubber, acrylonitrile-butadiene rubber, acrylonitrile-acrylate-butadiene terpolymer rubber, acrylonitrile-isoprene-butadiene terpolymer rubber and polychloroprene rubber.

* * * * *